United States Patent [19]
Sotheran et al.

[11] Patent Number: 5,861,894
[45] Date of Patent: Jan. 19, 1999

[54] BUFFER MANAGER

[75] Inventors: Martin William Sotheran, Dursley; Helen R. Finch, Bristol, both of United Kingdom

[73] Assignee: Discovision Associates, Irvine, Calif.

[21] Appl. No.: 474,603

[22] Filed: Jun. 7, 1995

Related U.S. Application Data

[62] Division of Ser. No. 399,801, Mar. 7, 1995, abandoned, and a division of Ser. No. 400,397, Mar. 7, 1995, which is a continuation-in-part of Ser. No. 382,958, Feb. 2, 1995, abandoned, which is a continuation of Ser. No. 82,291, Jun. 24, 1993, abandoned.

[30] Foreign Application Priority Data

| Mar. 24, 1994 | [GB] | United Kingdom | 9405914 |
| Jul. 29, 1994 | [GB] | United Kingdom | 9415365 |
| Feb. 28, 1995 | [GB] | United Kingdom | 9503964 |

[51] Int. Cl.$^6$ ........................................... G09G 5/00
[52] U.S. Cl. .................. 345/516; 345/515; 345/196; 345/202; 345/193
[58] Field of Search .................. 345/200, 190, 345/193, 202, 196, 516, 515

[56] References Cited

U.S. PATENT DOCUMENTS

| 3,875,391 | 4/1975 | Shapiro et al. | 235/156 |
| 3,893,042 | 7/1975 | Whitman et al. | 331/55 |

(List continued on next page.)

FOREIGN PATENT DOCUMENTS

| 0075893 | 4/1983 | European Pat. Off. ........ G06F 13/00 |
| 0196911 | 10/1986 | European Pat. Off. . |
| 0255767 | 2/1988 | European Pat. Off. . |
| 0321628 | 6/1989 | European Pat. Off. . |
| 0589734 | 3/1994 | European Pat. Off. . |
| 0618728 | 10/1994 | European Pat. Off. . |
| 0639032 | 2/1995 | European Pat. Off. . |
| 61-080940 | 4/1986 | Japan . |
| 61-80940 | 4/1986 | Japan . |
| 1243631 | 8/1971 | United Kingdom . |
| 2039106 | 7/1980 | United Kingdom ............ G06F 13/00 |
| 2045035 | 10/1980 | United Kingdom . |
| 2059724 | 4/1981 | United Kingdom . |
| 2171578 | 8/1986 | United Kingdom . |
| 2194085 | 2/1988 | United Kingdom . |
| 2268035 | 12/1993 | United Kingdom . |
| 2269070 | 1/1994 | United Kingdom . |
| 9425935 | 11/1994 | WIPO . |

OTHER PUBLICATIONS

Chong, "A Data Flow Architecture For Digital Image Processing," WesconTech. Papers No. 4/6, Oct. 30, 1984, Anaheim, California, USA, pp. 1–10.

P. Yip, et al., "DIT and DIF Algorithm for Discrete Sine and Cosine Transforms" Proceedings of the International Symposium on Circuits and Systems, IEEE Press, New York, US, vol. 2/3, 5 Jun. 1985, Kyoto, JP, pp. 941–944.

Hsieh S. Hou, "A Fast Recursive Algorithm for Computing the Discrete Cosine Transform," IEEE Transactions on Acoustics, Speech, and Signal Processing, vol. 35, No. 10, Oct. 1987, IEEE Press, New York, US, pp. 1455–1461.

Komori et al., An Elastic Pipeline Mechanism By Self–Timed Circuits, IEEE Journal Of Solid–State Circuits, vol. 23, No. 1, Feb. 1988, New York, NY, USA, pp. 111–117.

A. Gupta et al., "A Fast Recursive Algorithm for the Discrete Sine Transform," IEEE Transactions on Acoustics, Speech and Signal Processing, vol. 38, No. 3, Mar. 1990, IEEE Press, New York, US, pp. 553–557.

(List continued on next page.)

Primary Examiner—Richard A. Hjerpe
Assistant Examiner—Kent Chang
Attorney, Agent, or Firm—Ronald J. Clark; Robert T. Braun; Arthur S. Bickel

[57] ABSTRACT

This invention provides a method to control the buffering of encoded video data organized as frames or fields. This method involves determining the picture number of each incoming decoded frame, determining the expected presentation number at any time and marking any buffer as ready when its picture number is on or after the presentation number.

8 Claims, 4 Drawing Sheets

U.S. PATENT DOCUMENTS

| | | | |
|---|---|---|---|
| 3,962,685 | 6/1976 | Belle Isle | 340/172.5 |
| 4,135,242 | 1/1979 | Ward et al. | 364/200 |
| 4,142,205 | 2/1979 | Iinuma | 358/13 |
| 4,149,242 | 4/1979 | Pirz | 364/200 |
| 4,196,448 | 4/1980 | Whitehouse et al. | 358/135 |
| 4,215,369 | 7/1980 | Iijima | 358/146 |
| 4,225,920 | 9/1980 | Stokes | 364/200 |
| 4,228,497 | 10/1980 | Gupta et al. | 364/200 |
| 4,236,228 | 11/1980 | Nagashima et al. | 365/114 |
| 4,251,864 | 2/1981 | Kindell et al. | 364/200 |
| 4,307,447 | 12/1981 | Provanzano et al. | 364/200 |
| 4,334,246 | 6/1982 | Saran | 358/261 |
| 4,356,550 | 10/1982 | Katzman et al. | 364/200 |
| 4,433,308 | 2/1984 | Hirata | 331/17 |
| 4,437,072 | 3/1984 | Asami | 331/1 A |
| 4,442,503 | 4/1984 | Schutt et al. | 364/900 |
| 4,467,409 | 8/1984 | Potash et al. | 364/200 |
| 4,467,443 | 8/1984 | Shima | 364/900 |
| 4,495,629 | 1/1985 | Zasio et al. | 377/70 |
| 4,507,731 | 3/1985 | Morrison | 364/200 |
| 4,540,903 | 9/1985 | Cooke et al. | 307/465 |
| 4,580,066 | 4/1986 | Berndt | 307/276 |
| 4,593,267 | 6/1986 | Kuroda et al. | 340/347 |
| 4,598,372 | 7/1986 | McRoberts | 364/518 |
| 4,617,657 | 10/1986 | Drynan et al. | 370/60 |
| 4,630,230 | 12/1986 | Sundet | 364/900 |
| 4,679,163 | 7/1987 | Arnould et al. | 364/725 |
| 4,689,823 | 8/1987 | Wojcik et al. | 382/41 |
| 4,692,880 | 9/1987 | Merz et al. | 364/521 |
| 4,710,866 | 12/1987 | Zolnowsky et al. | 364/200 |
| 4,785,349 | 11/1988 | Keith et al. | 358/136 |
| 4,789,927 | 12/1988 | Hannah | 364/200 |
| 4,799,056 | 1/1989 | Hattori et al. | 340/799 |
| 4,799,677 | 1/1989 | Frederiksen | 273/1 E |
| 4,807,028 | 2/1989 | Hatori et al. | 358/133 |
| 4,811,214 | 3/1989 | Nosenchuck et al. | 364/200 |
| 4,811,413 | 3/1989 | Kimmel | 382/41 |
| 4,829,465 | 5/1989 | Knauer et al. | 364/725 |
| 4,831,440 | 5/1989 | Borgers et al. | 358/133 |
| 4,841,436 | 6/1989 | Asano et al. | 364/200 |
| 4,855,947 | 8/1989 | Zymslowski et al. | 364/200 |
| 4,866,510 | 9/1989 | Goodfellow et al. | 358/13 |
| 4,885,786 | 12/1989 | Anderson et al. | 382/47 |
| 4,897,803 | 1/1990 | Calarco et al. | 364/518 |
| 4,910,683 | 3/1990 | Bishop et al. | 364/518 |
| 4,912,668 | 3/1990 | Aubie et al. | 364/725 |
| 4,922,341 | 5/1990 | Strobach | 358/136 |
| 4,922,418 | 5/1990 | Dolecek | 364/200 |
| 4,924,298 | 5/1990 | Kitamura | 358/12 |
| 4,924,308 | 5/1990 | Feuchtwanger | 358/133 |
| 4,943,916 | 7/1990 | Asano et al. | 364/200 |
| 4,953,082 | 8/1990 | Nomura et al. | 364/200 |
| 4,975,595 | 12/1990 | Roberts et al. | 307/272.2 |
| 4,985,766 | 1/1991 | Morrison et al. | |
| 4,989,138 | 1/1991 | Radochonski | 364/200 |
| 5,003,204 | 3/1991 | Cushing et al. | 307/465 |
| 5,010,401 | 4/1991 | Murakami et al. | 358/136 |
| 5,021,947 | 6/1991 | Campbell et al. | 364/200 |
| 5,035,624 | 7/1991 | Hosoya et al. | 434/309 |
| 5,036,475 | 7/1991 | Ueda | 364/518 |
| 5,043,880 | 8/1991 | Yoshida | 364/200 |
| 5,050,166 | 9/1991 | Cantoni et al. | 370/94.1 |
| 5,053,985 | 10/1991 | Friedlander et al. | 364/725 |
| 5,057,793 | 10/1991 | Cowley et al. | 331/1 A |
| 5,060,242 | 10/1991 | Arbeiter | 375/122 |
| 5,081,450 | 1/1992 | Lucas et al. | 340/728 |
| 5,086,489 | 2/1992 | Shimura | 382/56 |
| 5,107,345 | 4/1992 | Lee | 358/432 |
| 5,111,292 | 5/1992 | Kuriacose et al. | 358/133 |
| 5,113,255 | 5/1992 | Nagata et al. | 358/136 |
| 5,122,873 | 6/1992 | Golin | 358/133 |
| 5,122,875 | 6/1992 | Raychaudhuri et al. | 358/133 |
| 5,122,948 | 6/1992 | Zapolin | 364/131 |
| 5,124,790 | 6/1992 | Nakayama | 358/133 |
| 5,126,842 | 6/1992 | Andrews et al. | 358/133 |
| 5,130,568 | 7/1992 | Miller et al. | 307/272.2 |
| 5,134,487 | 7/1992 | Taguchi et al. | 358/209 |
| 5,134,699 | 7/1992 | Aria et al. | 395/425 |
| 5,136,371 | 8/1992 | Savatier et al. | 358/133 |
| 5,136,695 | 8/1992 | Goldshlag et al. | 345/190 |
| 5,142,380 | 8/1992 | Sakagami et al. | 358/432 |
| 5,146,325 | 9/1992 | Ng | 358/135 |
| 5,146,326 | 9/1992 | Hasegawa | 358/135 |
| 5,148,271 | 9/1992 | Kato et al. | 358/133 |
| 5,151,875 | 9/1992 | Sato | 364/784 |
| 5,159,449 | 10/1992 | Allmendinger | 358/136 |
| 5,161,221 | 11/1992 | Van Nostrand | 395/425 |
| 5,164,819 | 11/1992 | Music | 358/13 |
| 5,168,356 | 12/1992 | Acampora et al. | 358/133 |
| 5,168,375 | 12/1992 | Reisch et al. | 358/432 |
| 5,172,011 | 12/1992 | Leuthold et al. | 307/272.2 |
| 5,173,695 | 12/1992 | Sun et al. | 341/67 |
| 5,175,617 | 12/1992 | Wallace et al. | 358/133 |
| 5,184,347 | 2/1993 | Farwell et al. | 370/94.1 |
| 5,185,819 | 2/1993 | Ng et al. | 382/56 |
| 5,189,526 | 2/1993 | Sasson | 358/432 |
| 5,191,548 | 3/1993 | Balkanski et al. | 364/725 |
| 5,193,002 | 3/1993 | Guichard et al. | 358/133 |
| 5,200,925 | 4/1993 | Morooka | 365/219 |
| 5,201,056 | 4/1993 | Daniel et al. | 395/800 |
| 5,202,847 | 4/1993 | Bolton et al. | 364/725 |
| 5,203,003 | 4/1993 | Donner | 395/800 |
| 5,212,549 | 5/1993 | Ng et al. | 358/135 |
| 5,212,742 | 5/1993 | Normile et al. | 382/56 |
| 5,214,507 | 5/1993 | Aravind et al. | 358/133 |
| 5,214,770 | 5/1993 | Ramanujan et al. | 395/425 |
| 5,216,724 | 6/1993 | Suzuki et al. | 382/7 |
| 5,218,436 | 6/1993 | Sugiyama et al. | 358/141 |
| 5,223,926 | 6/1993 | Stone et al. | 358/133 |
| 5,226,131 | 7/1993 | Grafe et al. | 395/375 |
| 5,227,863 | 7/1993 | Bilbrey et al. | 348/578 |
| 5,227,878 | 7/1993 | Puri | 358/136 |
| 5,228,098 | 7/1993 | Crinon et al. | 382/56 |
| 5,231,484 | 7/1993 | Gonzales et al. | 358/133 |
| 5,231,486 | 7/1993 | Acampora et al. | 358/133 |
| 5,233,420 | 8/1993 | Piri et al. | 358/149 |
| 5,233,545 | 8/1993 | Ho et al. | 364/569 |
| 5,237,413 | 8/1993 | Israelsen et al. | 358/160 |
| 5,237,432 | 8/1993 | Calarco et al. | 358/451 |
| 5,241,383 | 8/1993 | Chen et al. | 358/136 |
| 5,241,635 | 8/1993 | Papadopoulos et al. | 395/375 |
| 5,241,658 | 8/1993 | Masterson et al. | 395/162 |
| 5,249,146 | 9/1993 | Uramoto et al. | 364/725 |
| 5,253,058 | 10/1993 | Gharavi | 358/136 |
| 5,253,078 | 10/1993 | Balkanski et al. | 358/426 |
| 5,257,213 | 10/1993 | Kim et al. | 364/725 |
| 5,257,223 | 10/1993 | Dervisoglu | 365/154 |
| 5,258,725 | 11/1993 | Kinoshita | 331/17 |
| 5,260,781 | 11/1993 | Soloff et al. | 358/133 |
| 5,260,782 | 11/1993 | Hui | 358/133 |
| 5,261,064 | 11/1993 | Wyland | 395/400 |
| 5,276,513 | 1/1994 | van der Wal et al. | 358/136 |
| 5,276,784 | 1/1994 | Ohki | 395/127 |
| 5,276,832 | 1/1994 | Holman, Jr. | 395/425 |
| 5,278,520 | 1/1994 | Parker et al. | 331/1 A |
| 5,278,646 | 1/1994 | Civanlar et al. | 358/133 |
| 5,278,647 | 1/1994 | Hingorani et al. | 358/136 |
| 5,283,646 | 2/1994 | Bruder | 348/415 |
| 5,287,178 | 2/1994 | Acampora et al. | 348/384 |
| 5,287,182 | 2/1994 | Haskell et al. | 348/500 |
| 5,287,420 | 2/1994 | Barrett | 382/56 |
| 5,289,276 | 2/1994 | Siracusa et al. | 348/467 |
| 5,293,229 | 3/1994 | Iu | 348/415 |
| 5,294,894 | 3/1994 | Gebara | 331/1 A |
| 5,297,263 | 3/1994 | Ohtsuka et al. | 395/375 |
| 5,298,896 | 3/1994 | Lei et al. | 341/51 |
| 5,298,992 | 3/1994 | Pietras et al. | 348/415 |
| 5,299,025 | 3/1994 | Shirasawa | 358/400 |
| 5,300,949 | 4/1994 | Rodriguez et al. | 345/202 |
| 5,301,019 | 4/1994 | Citta | 348/416 |

| | | | |
|---|---|---|---|
| 5,301,032 | 4/1994 | Hong et al. | 358/261.2 |
| 5,301,040 | 4/1994 | Hoshi et al. | 358/465 |
| 5,301,136 | 4/1994 | McMillan, Jr. et al. | 364/725 |
| 5,301,272 | 4/1994 | Atkins | 395/165 |
| 5,301,344 | 4/1994 | Kolchinsky | 395/800 |
| 5,304,953 | 4/1994 | Heim et al. | 331/1 A |
| 5,305,438 | 4/1994 | MacKay et al. | 395/164 |
| 5,307,180 | 4/1994 | Williams et al. | 358/448 |
| 5,307,449 | 4/1994 | Kelley et al. | 395/119 |
| 5,309,527 | 5/1994 | Ohki | 382/56 |
| 5,319,460 | 6/1994 | Kubo | 348/715 |
| 5,321,806 | 6/1994 | Meinerth et al. | 395/162 |
| 5,341,371 | 8/1994 | Simpson | 370/85.4 |
| 5,343,218 | 8/1994 | Maeda | 345/116 |
| 5,351,047 | 9/1994 | Behlen | 341/67 |
| 5,357,606 | 10/1994 | Adams | 395/164 |
| 5,367,636 | 11/1994 | Colley et al. | 395/200.16 |
| 5,384,598 | 1/1995 | Rodriguez et al. | 348/384 |
| 5,384,745 | 1/1995 | Konishi et al. | 365/230.03 |
| 5,386,385 | 1/1995 | Stephens, Jr. | 365/189.05 |
| 5,386,537 | 1/1995 | Asano | 395/425 |
| 5,390,029 | 2/1995 | Williams et al. | 358/448 |
| 5,390,149 | 2/1995 | Vogley et al. | 365/189.01 |
| 5,392,071 | 2/1995 | Richards et al. | 348/398 |
| 5,396,497 | 3/1995 | Veltman | 370/100.1 |
| 5,396,592 | 3/1995 | Fujimoto | 395/162 |
| 5,404,474 | 4/1995 | Crook et al. | 395/400 |
| 5,406,279 | 4/1995 | Anderson et al. | 341/51 |
| 5,412,782 | 5/1995 | Hausman et al. | 395/250 |
| 5,414,813 | 5/1995 | Shiobara | 395/200 |
| 5,421,028 | 5/1995 | Swanson | 395/800 |
| 5,425,061 | 6/1995 | Laczko, Sr. et al. | 375/371 |
| 5,426,606 | 6/1995 | Takai | 365/189.05 |
| 5,430,488 | 7/1995 | Hedley | 348/446 |
| 5,442,790 | 8/1995 | Nosenchuck | 395/700 |
| 5,446,866 | 8/1995 | Drako et al. | 395/500 |
| 5,448,310 | 9/1995 | Kopet et al. | 348/719 |
| 5,448,568 | 9/1995 | Delpuch et al. | 372/94.2 |
| 5,450,599 | 9/1995 | Horvath et al. | 395/800 |
| 5,452,006 | 9/1995 | Auld | 348/390 |
| 5,457,482 | 10/1995 | Rhoden et al. | 345/201 |
| 5,457,780 | 10/1995 | Shaw et al. | 395/165 |
| 5,461,679 | 10/1995 | Normile et al. | 395/650 |
| 5,467,137 | 11/1995 | Zdepski | 348/423 |
| 5,481,307 | 1/1996 | Goldstein et al. | 348/384 |
| 5,481,689 | 1/1996 | Stamm et al. | 395/412 |
| 5,486,876 | 1/1996 | Lew et al. | 348/719 |
| 5,487,064 | 1/1996 | Galand et al. | 370/60 |
| 5,488,432 | 1/1996 | Guillon et al. | 348/717 |
| 5,490,247 | 2/1996 | Tung et al. | 395/162 |
| 5,495,291 | 2/1996 | Adams | 348/390 |
| 5,497,498 | 3/1996 | Taylor | 395/800 |
| 5,502,494 | 3/1996 | Auld | 348/426 |
| 5,504,869 | 4/1996 | Uchida | 395/375 |
| 5,510,857 | 4/1996 | Kopet et al. | 348/699 |
| 5,517,462 | 5/1996 | Iwamoto et al. | 365/233 |
| 5,517,603 | 5/1996 | Kelley et al. | 395/126 |
| 5,517,670 | 5/1996 | Allen et al. | 395/850 |
| 5,535,290 | 7/1996 | Allen | 382/250 |
| 5,543,853 | 8/1996 | Haskell et al. | 348/497 |
| 5,553,005 | 9/1996 | Voeten et al. | 364/514 |
| 5,553,258 | 9/1996 | Godiwala et al. | 395/403 |
| 5,559,999 | 9/1996 | Maturi et al. | 395/550 |
| 5,566,089 | 10/1996 | Hoogenboom | 364/514 A |
| 5,568,165 | 10/1996 | Kimura | 345/200 |
| 5,572,691 | 11/1996 | Koudmani | 395/405 |
| 5,574,933 | 11/1996 | Horst | 395/800 |
| 5,577,203 | 11/1996 | Reinert et al. | 345/200 |
| 5,579,052 | 11/1996 | Artieri | 348/416 |
| 5,590,283 | 12/1996 | Hillis et al. | 395/200.02 |
| 5,603,012 | 2/1997 | Sotheran | 395/500 |

OTHER PUBLICATIONS

H.R. Wu, et al., "A Two Dimensional Fast Cosine Transform Algorithm Based on Hou's Approach," IEEE Transaction on Acoustics, Speech, and Signal Processing, vol. 39, No. 2, Feb. 1991, IEEE Press, New York, US, pp. 544–546.

MacInnis, Alexander G. "The MPEG Systems Coding Specification." Signal Processing: Image Communication 4 (1992) pp. 153–159.

McCarthy, Charles L. "A Low–Cost Audio/Video Decoder Solution for MPEG System Streams." IEEE Jun. 21, 1994, pp. 312–313.

Kinuhata, K. and Hideo Yamamoto. "Analysis of Field Correspondence and Field Memory Capacity in TV Standard Conversion." Electronics and Communications in Japan, Oct. 1974 USA vol. 57 No. 10 pp. 56–63 XP002047538.

Yamamoto, Hideo and K. Kinuhata. "Analysis of Field Correspondence and Field Memory Capacity in TV Standard Conversion." Abstracts—Transactions of the Institute of Electronics and Communications Engineers of Japan, vol. 57 No. 10 Oct. 1974 pp. 14–15 XP002047539.

Foley, J.D. et al. "Breshman's Line Algorithm" Electrochemistry, Proceedings of the First Conference Held in Sydney Feb. 1963. J.A. Friend and F. Gutmann Jan. 1, 1982 pp. 433–436. XP000563829.

Chong, Y.M.: "A Data–Flow Architecture for Digital Image Processing," Wescon '84 Conference Record, Anaheim, CA, USA, Oct. 30, 1984–Nov. 1, 1984, pp. 4.6.1–4.6.10.

Elliott J A et al: "Real–Time Simulation of Videophone Image Coding Algorthims on Reconfigurable Multicomputers," IEEE Proceedings E. Computers & Digital Techniques, vol. 139, No. 3 Part E., May 1, 1992, pp. 269–279, XP0000306411.

Hong, Yang–Chang; T.H. Payne. A Hybrid Approach for Efficient Dataflow Computing, Computers and Communications, 1990 Int'l Phoenix Conference, IEEE Publications, May 1990 pp. 170–178.

Kaoru, Uchida et al: "A Pipelined Dataflow Processor Architecture Based on a Variable Length Token Concept," Architecture, University Park, Aug. 15–19, 1988, vol. 1, 15 Aug. 1988, Briggs F A, pp. 209–216, XP000079309.

Kopet, Tom: "Programmable Architectures for Real–Time Video Compression," 4th International Conference on Signal Processing Applications & Technology, vol. 2, Sep. 28, 1993–Oct. 1, 1993, Santa Clara, California, USA, pp. 1031–1038.

Mayer, A.C.: "The Architecture of a Single–Chip Processor Array for Videocompression," Proceedings of the International Conference on Consumer Electronics, Rosemont, Jun. 8–10, 1993, No. Conf. 12, Aug. 6, 1993, Institute of Electrical and Electronics Engineers, pp. 294–295, XP0000427624.

Normile, James. Dan Wright, Image Compression Using Coarse Grain Parallel Processing, ICASSP 1991: Acoustics, Speech & Signal Processing Conference, IEEE Publications. Jul. 1991 pp. 1121–1124.

Tokumichi Murakami et al: "A DSP Architectural Design for Low Bit–Rate Motion Video Codec," IEEE Transactions on Circuits and Systems, vol. 36, No. 10, Oct. 1, 1989, pp. 1267–1274, XP000085313.

BUFFER MANAGER

REFERENCE TO RELATED APPLICATIONS

This Application is a division of application Ser. No. 08/399,801, filed Mar. 7,1995 and a division of application Ser. No. 400,397, filed Mar. 7,1995, which is a continuation-in-part of U.S. application Ser. No. 08/382,958 filed on Feb. 2, 1995, which is a continuation of U.S. application Ser. No. 08/082,291 filed on Jun. 24, 1993 (now abandoned).

The following Applications assigned to the assignee hereof contain subject matter related to this Application: Ser. Nos. 08/399,665, filed Mar. 07, 1995;08/400,058, filed Mar. 07, 1995; 08/399,800, filed Mar. 07, 1995; 08/399,801, filed Mar 07, 1995; 08/810,780, filed Mar. 05, 1997; 08/474,222, filed Jun. 07, 1995; 08/486,481, filed Jun. 07,1995; 08/474, 231, filed Jun. 07,1995; 08/474,830, filed Jun. 07, 1995; 08/474,220, filed Jun. 07,1995; 08/473,868, filed Jun. 07,1995; 08/474,603, filed Jun. 07, 1995; 08/477,048, filed Jun. 07,1995; 08/485,744, filed Jun. 07,1995; 08/399,799, filed Mar. 07, 1995; (not yet known), filed Mar. 4, 1997.

BACKGROUND OF THE INVENTION

The present invention is directed to a decompression circuit which operates to decompress or decode a plurality of differently encoded input signals, and, more particularly, to a method of controlling the buffering of encoded video data in said circuit.

Previous buffer manager systems were hardwired to implement certain predetermined conversions, for example, 3-2 pulldown systems. The present buffer manager does not use a predefined sequence of replication or skipping of frames, as in conventional 3-2 pulldown systems, and thus any ratio of encoded frame rate and display frame rate can be accommodated. The present buffer manager is thus more flexible with respect to its strategy for dropping or duplicating frames in order to account for differences in the encoded data frame rate and the display frame rate.

SUMMARY OF THE INVENTION

The invention provides a method for buffering encoded video data organized as frames comprising determining the picture number of a frame, determining the desired presentation number of a frame and marking the buffer as ready when the picture number is on or after the desired presentation number.

Figure 1:
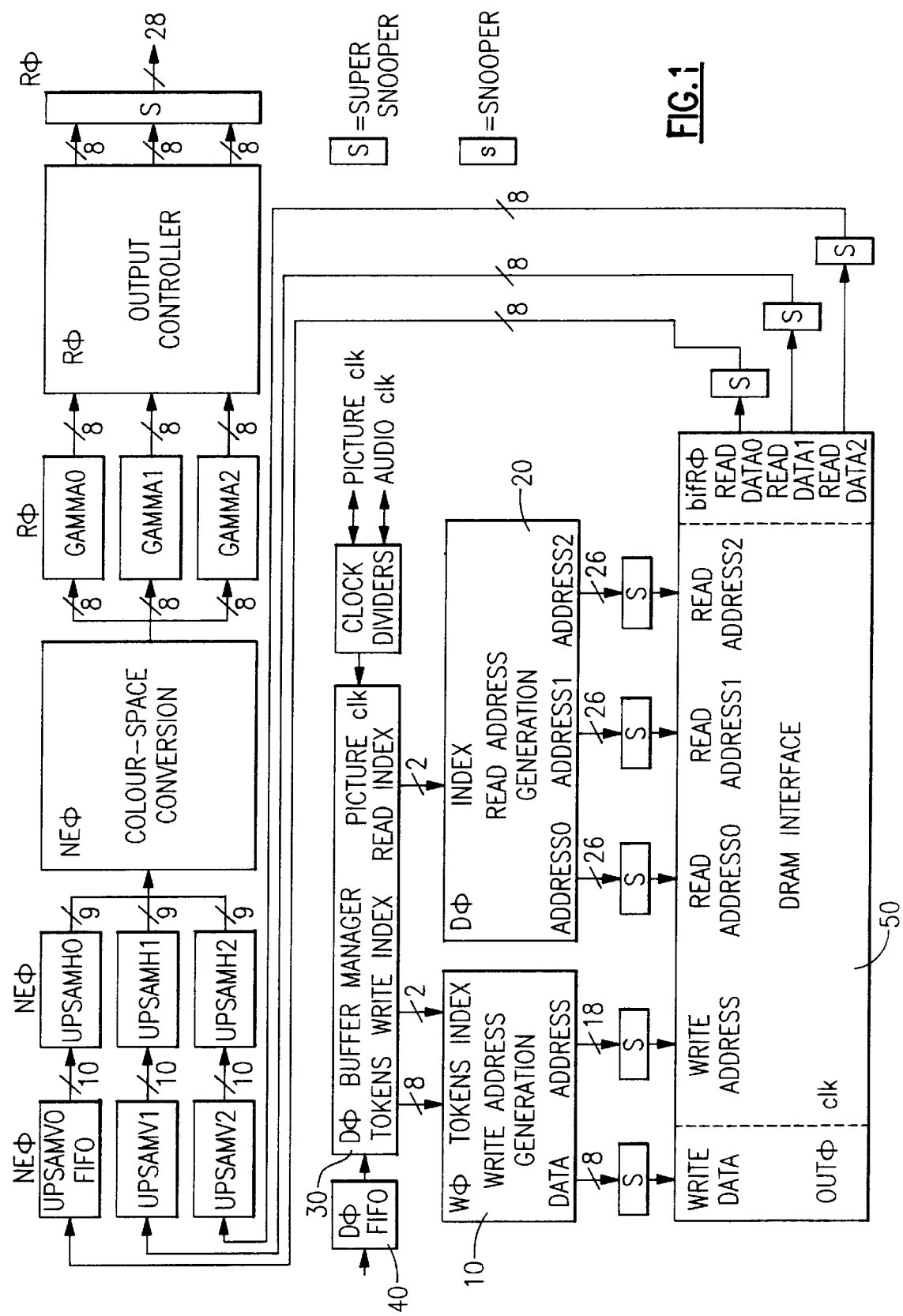
FIG. 1 is a block diagram of an image formatter.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various way. Also, it should be understood that the phraseology and terminology used herein is for the purpose of description and should not be regarded as limiting.

DETAILED DESCRIPTION OF THE INVENTION

An image formatter is shown in FIG. 1. There are two address generators, one for writing 10 and one for reading 20, a buffer manager 30 which supervises the two address generators 10 and 20 and provides frame-rate conversion, a data processing pipeline including vertical and horizontal upsamplers, colour-space conversion and gamma correction, and a final control block which regulates the output of the processing pipeline.

Tokens arriving at the input to the image formatter are buffered in the FIFO 40 and transferred into the buffer manager 30. This block detects the arrival of new pictures and determines the availability of a buffer in which to store each one. If there is a buffer available, it is allocated to the arriving picture and its index is transferred to the write address generator 10. If there is no buffer available, the incoming picture will be stalled until one does become free. All tokens are passed on to the write address generator 10. This operation is described in greater detail in U.K. Serial No. 9405914.4 filed on Mar. 24, 1994, which is incorporated herein by reference.

Each time the read address generator 20 receives a VSYNC signal from the display system, a request is made to the buffer manager 30 for a new display buffer index. If there is a buffer containing complete picture data, and that picture is deemed to be ready for display, that buffer's index will be passed to the display address generator. If not, the buffer manager sends the index of the last buffer to be displayed. At start-up, zero is passed as the index until the first buffer is full. A picture is deemed to be ready for display if its number (calculated as each picture is input) is greater than or equal to the picture number which is expected at the display (presentation number) given the encoding frame rate. The expected picture number is determined by counting picture clock pulses, where picture clock can be generated either locally by the clock dividers, or externally. This technology allows frame-rate conversion (e.g. 2-3 pulldown).

External DRAM is used for the buffers, which can be either two or three in number. Three are necessary if frame-rate conversion is to be effected.

The purpose of the buffer manager 30 is to supply the address generators with indices indicating any of either two or three external buffers for writing and reading of picture data. The allocation of these indices is influenced by three principal factors, each representing the effect of one of the timing regimes in operation: the rate at which picture data arrives at the input to image formatter (coded data rate), the rate at which data is displayed (display data rate), and the frame rate of the encoded video sequence (presentation rate).

A three-buffer system enables the presentation rate and the display rate to differ (e.g. 2-3 pulldown), so that frames are either repeated or skipped as necessary to achieve the best possible sequence of frames given the timing constraints of the system. Pictures which present some difficulty in decoding may also be accommodated in a similar way, so that if a picture takes longer than the available display time to decode, the previous frame will be repeated while everything else 'catches up'. In a two-buffer system the three timing regimes must be locked—it is the third buffer which provides the flexibility for taking up slack.

The buffer manager operates by maintaining certain status information associated with each external buffer—this includes flags indicating if the buffer is in use, full of data, or ready for display, and the picture number within the sequence of the picture currently stored in the buffer. The presentation number is also recorded, this being a number which increments every time a picture clock pulse is received, and represents the picture number which is currently expected for display based on the frame rate of the encoded sequence.

An arrival buffer (a buffer to which incoming data will be written) is allocated every time a PICTURE_START token is detected at the input, and this buffer is then flagged as IN_USE; on PICTURE_END, the arrival buffer will be de-allocated (reset to zero) and the buffer flagged as either FULL or READY depending on the relationship between the picture number and the presentation number.

Figure 5:
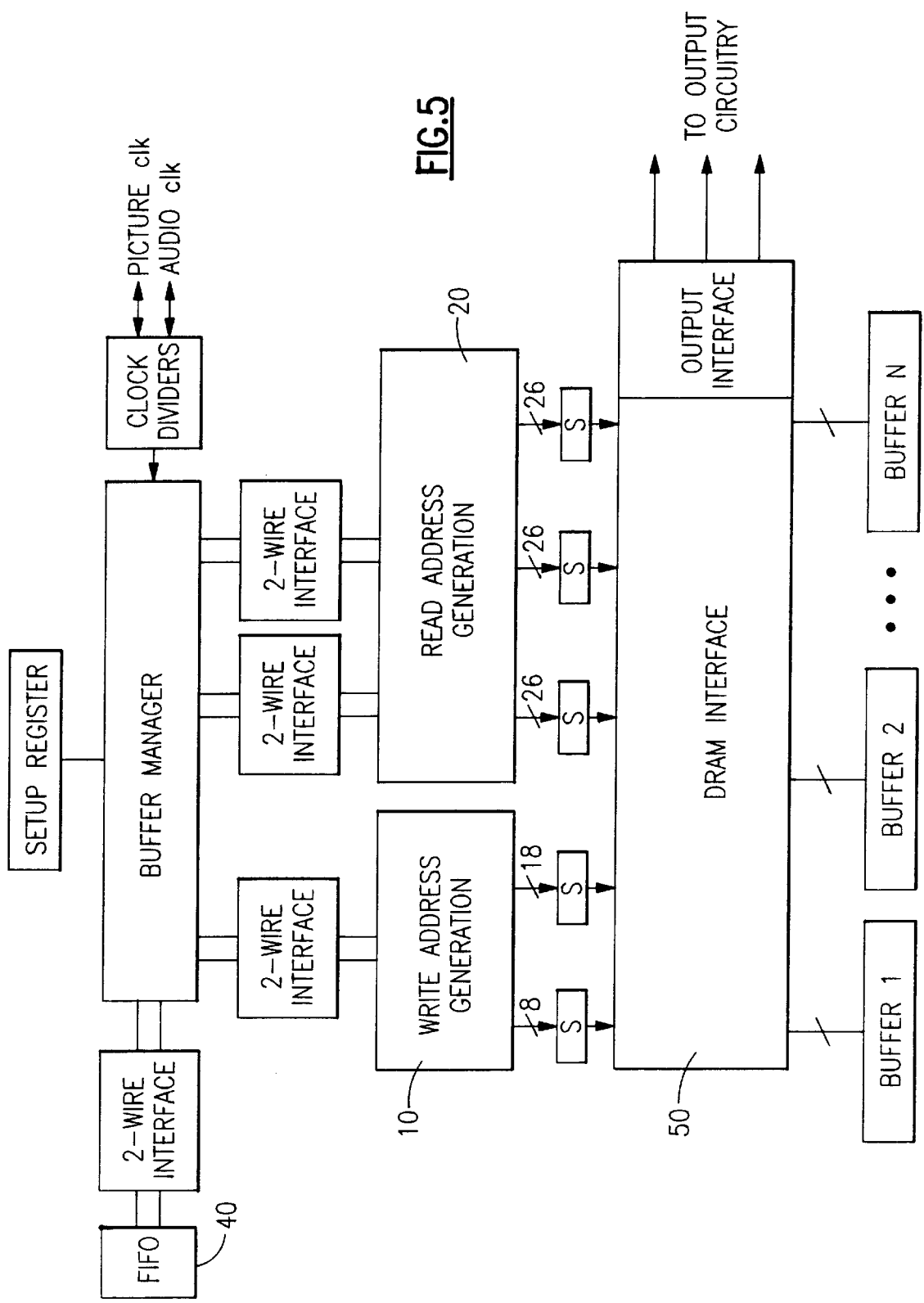
FIG. 5 is a block diagram of an embodiment of the invention.

A simple two-wire valid/accept protocol is used at all levels in the chip-set to control the flow of information and its timing diagram is presented in FIG. 5. Data is only transferred between blocks when both the sender and receiver are observed to be ready when the clock rises. Possible events are:

1) Data transfer;
2) Receiver not ready; and
3) Sender not ready.

If the sender is not ready (as in 3) Sender not ready, above) the input of the receiver must wait. If the receiver is not ready (as in 2) Receiver not ready, above) the sender will continue to present the same data on its output until it is accepted by the receiver.

In addition to the data signals there are three other signals transmitted via the two-wire interface: valid; .accept; and extension.

The two wire interface is intended for short range, point to point communication between chips.

The decoder chips should be placed adjacent to each other, so as to minimize the length of the PCB tracks between chips. Where possible, track lengths should be kept below 25 mm. The PCB track capacitance should be kept to a minimum.

The clock distribution should be designed to minimize the clock slew between chips. If there is any clock slew, it should be arranged so that "receiving chips" see the clock before "sending chips".

All chips communicating via two wire interfaces should operate from the same digital power supply.

The display address generator requests a new display buffer, once every vsync, via a two-wire-interface. If there is a buffer flagged as READY, then that will be allocated to display by the buffer manager. If there is no READY buffer, the previously displayed buffer will be repeated.

Each time the presentation number changes this is detected and every buffer containing a complete picture is tested for READY-ness by examining the relationship between its picture number and the presentation number. Buffers are considered in turn, and when any is deemed to be READY this automatically cancels the READY-ness of any which was previously flagged as READY, this then being flagged as EMPTY. This works because later picture numbers are stored, by virtue of the allocation scheme, in the buffers that are considered later.

TEMPORAL_REFERENCE tokens in H261 cause a buffer's picture number to be modified if skipped pictures in the input stream are indicated. TEMPORAL_REFERENCE tokens in MPEG have no effect.

A FLUSH token causes the input to stall until every buffer is either EMPTY or has been allocated as the display buffer; presentation number and picture number are then reset and a new sequence can commence.

All data is input to the buffer manager from the input fifo, bm_front. This transfer takes place via a two-wire interface, the data being 8 bits wide plus an extension bit. All data arriving at the buffer manager is guaranteed to be complete tokens, a necessity for the continued processing of presentation numbers and display buffer requests in the event of significant gaps in the data upstream.

Tokens (8 bit data, 1 bit extension) are transferred to the write address generator via a two-wire interface. The arrival buffer index is also transferred on the same interface, so that the correct index is available for address generation at the same time as the PICTURE_START token arrives at waddrgen.

The interface to the read address generator comprises two separate two-wire interfaces which can be considered to act as 'request' and 'acknowledge' signals respectively—single wires are not adequate, however, because of the two two-wire-based state machines at either end.

The sequence of events normally associated with the dispaddr interface is as follows: dispaddr invokes a request, in response to a vsync from the display device, by asserting the drq_valid input to the buffer manager; when the buffer manager reaches an appropriate point in its state machine it will accept the request and go about allocating a buffer to be displayed; the disp_valid wire is then asserted, the buffer index is transferred, and this will normally be accepted immediately by dispaddr. There is an additional wire associated with this last two-wire-interface (rst_fld) which indicates that the field number associated with the current index must be reset regardless of the previous field number.

The buffer manager block uses four bits of microprocessor address space, together with the 8-bit data bus and read and write strobes. There are two select signals, one indicating user-accessible locations and the other indicating test locations which should not require access under normal operation conditions.

The buffer manager is capable of producing two different events: index found and late arrival. The first of these is asserted when a picture arrives whose PICTURE_START extension byte (picture index) matches the value written into the BU_BM_TARGET_IX register at setup. The second event occurs when a display buffer is allocated whose picture number is less than the current presentation number, i.e. the processing in the system pipeline up to the buffer manager has not managed to keep up with the presentation requirements.

Picture clock is the clock signal for the presentation number counter and is either generated on-chip or taken from an external source (normally the display system). The buffer manager accepts both of these signals and selects one based on the value of pclk_ext (a bit in the buffer manager's control register). This signal also acts as the enable for the pad picoutpad, so that if the Image Formatter is generating its own picture clock this signal is also available as an output from the chip.

Figure 2:
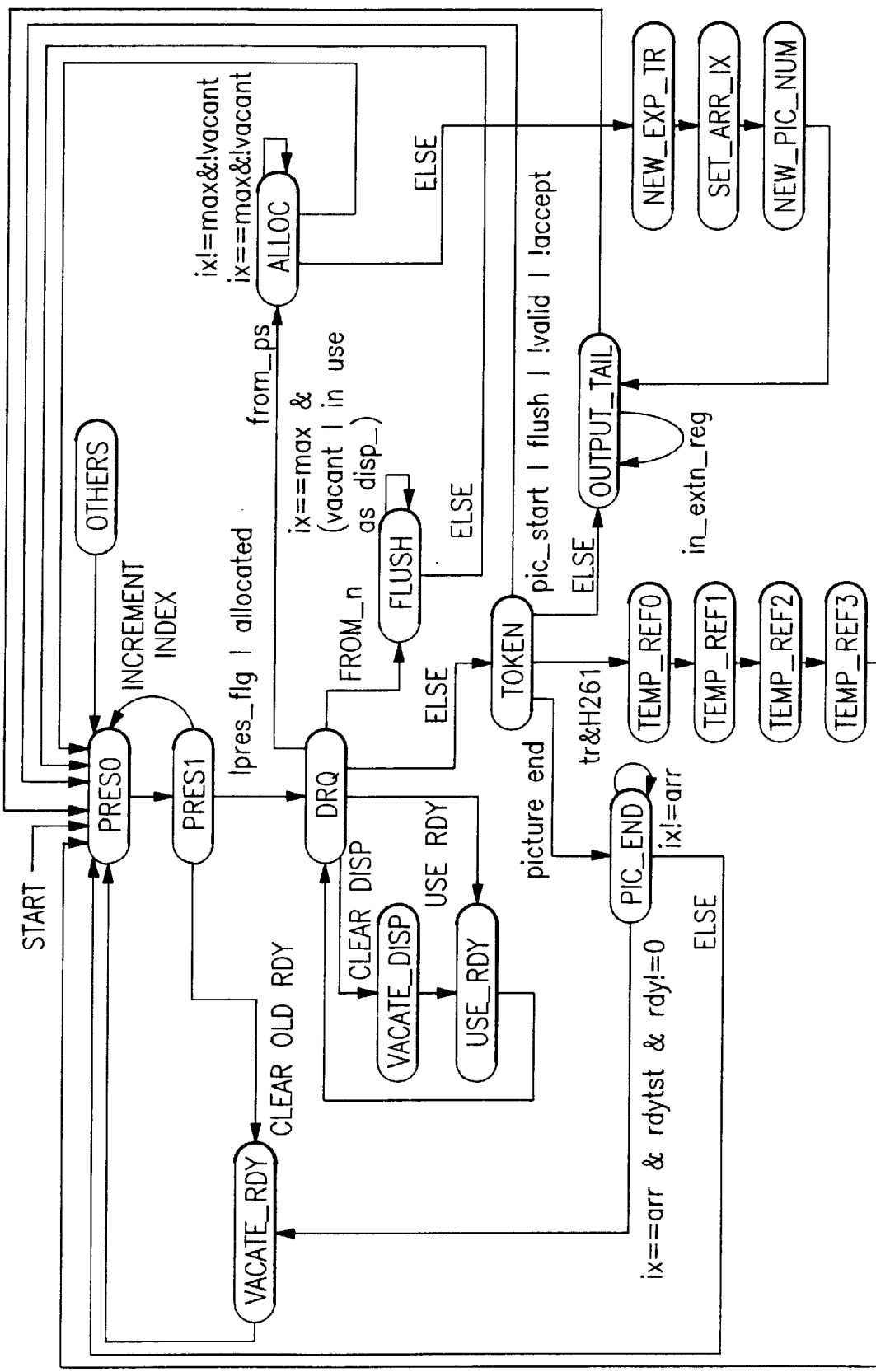
FIG. 2 is a diagram of the buffer manager state machine.

There are 19 states in the buffer manager's state machine. These interact as shown in FIG. 2. The reset state is PRES0, with flags set to zero such that the main loop is circulated initially.

Figure 3:
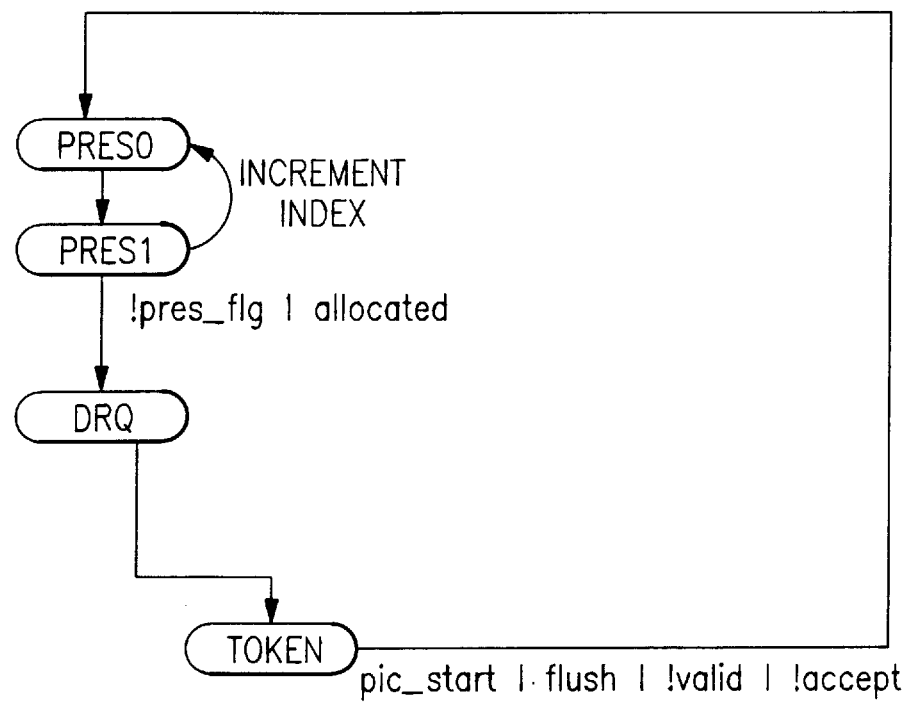
FIG. 3 illustrates the main loop of the state machine in FIG. 2.
Figure 4:
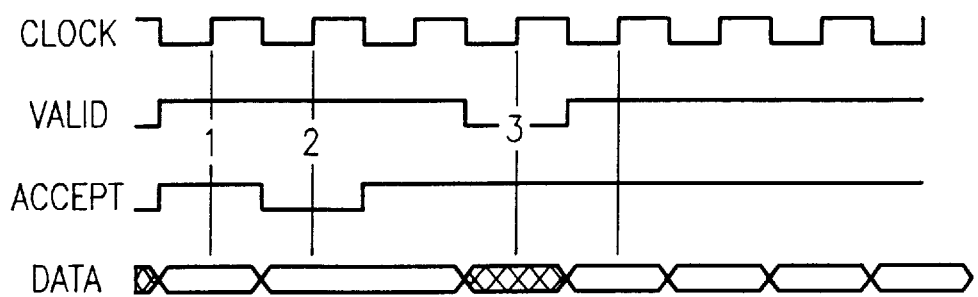
FIG. 4 illustrates the timing of a two-wire interface protocol according to the invention.

The main loop of the state machine comprises the states shown in FIG. 3 (highlighted in the main diagram—FIG. 2). States PRES0 and PRES1 are concerned with detecting a picture clock via the signal presfig. Two cycles are allowed for the tests involved since they all depend on the value of rdytst. If a presentation flag is detected, all of the buffers are examined for possible 'readiness', otherwise the state machine just advances to state DRQ. Each cycle around the PRES0-PRES1 loop examines a different buffer, checking for full and ready conditions: if these are met, the previous ready buffer (if one exists) is cleared, the new ready buffer is allocated and its status is updated. This process is repeated until all buffers have been examined (index==max buf) and the state then advances. A buffer is deemed to be ready for display when any of the following is true:

(pic_num>pres_num)&&((pic_num−pres_num)>=128)

or (pic_num<pres_num)&&((pres_num−pic_num)<=128)

or pic_num==pres num

State DRQ checks for a request for a display buffer (drq_valid_reg && disp_acc_reg). If there is no request the state advances (normally to state TOKEN—more on this later), otherwise a display buffer index is issued as follows: if there is no ready buffer, the previous index is re-issued or, if there is no previous display buffer, a null index (zero) is issued; if a buffer is ready for display, its index is issued and its state is updated—if necessary the previous display buffer is cleared. The state machine then advances as before.

State TOKEN is the usual option for completing the main loop: if there is valid input and the output is not stalled, tokens are examined for strategic values (described in later sections), otherwise control returns to state PRES0.

Control only diverges from the main loop when certain conditions are met. These are described in the following sections.

If during the PRES0-PRES1 loop a buffer is determined to be ready, any previous ready buffer needs to be vacated because only one buffer can be designated ready at any time. State VACATE_RDY clears the old ready buffer by setting its state to VACANT, and it resets the buffer index to 1 so that when control returns to the PRES0 state, all buffers will be tested for readiness. The reason for this is that the index is by now pointing at the previous ready buffer (for the purpose of clearing it) and there is no record of our intended new ready buffer index—it is necessary therefore to re-test all of the buffers.

Allocation of the display buffer index takes place either directly from state DRQ (state USE_RDY) or via state VACATE_DISP which clears the old display buffer state. The chosen display buffer is flagged as IN_USE, the value of rdy buf is set to zero, and the index is reset to 1 to return to state DRQ. disp buf is given the required index and the two-wire interface wires (disp_valid and drq_acc) are controlled accordingly. Control returns to state DRQ only so that the decision between states TOKEN, FLUSH and ALLOC does not need to be made in state USE_RDY.

On receipt of a PICTURE_END token control transfers from state TOKEN to state PICTURE_END where, if the index is not already pointing at the current arrival buffer, it is set to point there so that its status can be updated. Assuming both out_acc_reg and en_full are true, status can be updated as described below; if not, control remains in state PICTURE_END until they are both true. The en_full signal is supplied by the write address generator to indicate that the swing buffer has swung, i.e. the last block has been successfully written and it is therefore safe to update the buffer status.

The just-completed buffer is tested for readiness and given the status either FULL or READY depending on the result of the test. If it is ready, rdy_buf is given the value of its index and the set_la_ev signal (late arrival event) is set high (indicating that the expected display has got ahead in time of the decoding). The new value of arr_buf now becomes zero, and, if the previous ready buffer needs its status clearing, the index is set to point there and control moves to state VACATE_RDY; otherwise index is reset to 1 and control returns to the start of the main loop.

When a PICTURE_START token arrives during state TOKEN, the flag from ps is set, causing the basic state machine loop to be changed such that state ALLOC is visited instead of state TOKEN. State ALLOC is concerned with allocating an arrival buffer (into which the arriving picture data can be written), and cycles through the buffers until it finds one whose status is VACANT. A buffer will only be allocated if out_acc_reg is high, since it is output on the data two-wire-interface, so cycling around the loop will continue until this is the case. Once a suitable arrival buffer has been found, the index is allocated to arr_buf and its status is flagged as IN_USE. Index is set to 1, the flag from_ps is reset, and the state is set to advance to NEW_EXP_TR. A check is made on the picture's index (contained in the word following the PICTURE_START) to determine if it the same as targ_ix (the target index specified at setup) and, if so, set_if_ev (index found event) is set high.

The three states NEW_EXP_TR, SET_ARR_IX and NEW_PIC_NUM set up the new expected temporal reference and picture number for the incoming data—the middle state just sets the index to be arr_buf so that the correct picture number register is updated (note that this_pnum is also updated). Control then goes to state OUTPUT_TAIL which outputs data (assuming favourable two-wire interface signals) until a low extension is encountered, at which point the main loop is re-started. This means that whole data blocks (64 items) are output, within which there are no tests for presentation flag or display request.

A FLUSH token in the data stream indicates that sequence information (presentation number, picture number, rst_fld) should be reset. This can only happen when all of the data leading up to the FLUSH has been correctly processed and so it is necessary, having received a FLUSH, to monitor the status of all of the buffers until it is certain that all frames have been handed over to the display, i.e. all but one of the buffers have status EMPTY, and the other is IN_USE (as the display buffer). At that point a 'new sequence' can safely be started.

When a FLUSH token is detected in state TOKEN, the flag from_fl is set, causing the basic state machine loop to be changed such that state FLUSH is visited instead of state TOKEN. State FLUSH examines the status of each buffer in turn, waiting for it to become VACANT or IN_USE as display. The state machine simply cycles around the loop until the condition is true, then increments its index and repeats the process until all of the buffers have been visited. When the last buffer fulfils the condition, presentation number, picture number and all of the temporal reference registers assume their reset values; rst_fld is set to 1. The flag from_fl is reset and the normal main loop operation is resumed.

When a TEMPORAL_REFERENCE token is encountered, a check is made on the H261 bit and, if set, the four states TEMP_REF0 to TEMP_REF3 are visited. These perform the following operations:

TEMP_REF0: temp_ref=in_data_reg;

TEMP_REF1: delta=temp_ref−exp_tr; index=arr_buf;

TEMP_REF2: exp_tr=delta+exp_tr;

TEMP_REF3: pic_num[i]=this_pnum+delta;index=1;

State TOKEN passes control to state OUTPUT_TAIL in all cases other than those outlined above. Control remains here until the last word of the token is encountered (in_extn_reg is low) and the main loop is then re-entered.

The requirement to repeatedly check for the 'asynchronous' timing events of picture clock and display buffer request, and the necessary to have the buffer manager input stalled during these checks, means that when there is a continuous supply of data at the input to the buffer manager there will be a restriction on the data rate through the buffer manager. A typical sequence of states may be PRES0, PRES1, DRQ, TOKEN, OUTPUT_TAIL, each, with the exception of OUTPUT_TAIL, lasting one cycle. This means that for each block of 64 data items, there will be an overhead of 3 cycles during which the input is stalled (during states PRES0, PRES1 and DRQ) thereby slowing the write rate by 3/64 or approximately 5%. This number may occasionally increase to up to 13 cycles overhead when auxiliary branches of the state machine are executed under worst-case conditions. Note that such large overheads will only apply on a once-per-frame basis.

Presentation number free-runs during upi accesses; if presentation number is required to be the same when access is relinquished as it was when access was gained, this can be effected by reading presentation number after access is granted, and writing it back just before it is relinquished. Note that this is asynchronous, so it may be necessary to repeat the accesses several times to be sure they are effective.

The write address generator 10 receives tokens from the buffer manager 30 and detects the arrival of each new DATA token. As each arrives, it calculates a new address for the DRAM interface 50 in which to store the arriving block. The raw data is then passed to the DRAM interface 50 where it is written in to a swing buffer. Note that DRAM addresses are block addresses, and pictures in the DRAM are organised as rasters of blocks. Incoming picture data, however, is organised as sequences of macroblocks, so the address generation algorithm must take account of this.

The Buffer manager 30 is now described in further detail.

B.4.2 Overview

The buffer manager 30 provides four addresses for the DRAM interface 50. These addresses are page addresses in the DRAM. The DRAM interface is maintaining two FIFOs in the DRAM, the Coded Data Buffer and the Token Data Buffer. Hence the four addresses; a read and a write address for each buffer.

B.4.3 Interfaces

The Buffer Manager is connected only to the DRAM interface and to the microprocessor. The microprocessor need only be used for setting up the "Initialization registers" shown in Table B.4.4. The interface with the DRAM interface is the four eighteen bit addresses controlled by a REQuest/Acknowledge protocol for each address. (Not being in the datapath the Buffer Manager has no two-wire interfaces.)

Buffer Manager operates from DRAM interface clock generator and on the DRAM interface scan chain.

B.4.4 Address Calculation

The read and write addresses for each buffer are generated from 9 eighteen bit registers:

Initialization registers (RW from microprocessor)
BASECB-base address of coded data buffer
LENGTHCB-maximum size (in pages) of coded data buffer
BASETB-base address of token data buffer
LENGTHTB-maximum size (in pages) of token data buffer
LIMIT-size (in pages) of the DRAM.
Dynamic registers (RO from microprocessor)
READCB-coded data buffer read pointer relative to BASECB
NUMBERCB-coded data buffer write pointer relative to READCB
READTB-token data buffer read pointer relative to BASETB
NUMBERTB-token data buffer write pointer relative to READTB
To calculate addresses:

$$readaddr=(BASE+READ) \bmod LIMIT$$

$$writeaddr=(((READ+NUMBER) \bmod LENGTH)+BASE) \bmod LIMIT$$

The "mod LIMIT" term is used because a buffer may wrap around DRAM.

B.4.5 Block Description

The Buffer Manager is composed of three top level modules connected in a ring which snooper monitors the DRAM interface connection. The modules are bmprtize (prioritize), bminstr (instruction), and bmrecalc (recalculate) are arranged in a ring of that order and omsnoop (snoopers) on the address outputs.

Bmprtize deals with the REQ/ACK protocol, the FULL/EMPTY flags for the buffers and it maintains the state of each address, i.e., "is it a valid address?". From this information it dictates to bminstr which (if any) address should be recalculated. It also operates the BUF_CSR (status) microprocessor register, showing FULL/EMPTY flags, and the buf_access microprocessor register, controlling microprocessor write access to the buffer manager registers.

Bminstron being told by bmprtize to calculate an address, issues six instructions (one every two cycles) to control bmrecalc into calculating an address.

Bmrecalc recalculatesthe addresses under the instruction of bminstr. Running an instruction every two cycles. It contains all of the initialization and dynamic registers, and a simple ALU capable of addition, subtraction and modulus. It informs Sbmprtize of FULL/EMPTY states it detects and when it has finished calculating an address.

B.4.6 Block Implementation

B.4.6.1 Bmprtize

At reset the buf_access microprocessor register is set to one to allow the setting up of the initialization registers. While buf_access reads back one no address calculations are initiated because they are meaningless without valid initialization registers.

Once buf_access is de-asserted (write zero to it) bmprtize goes about making all the addresses valid (by recalculating them), because this is its purpose to keep all four addresses valid. At this stage the Buffer Manager is "starting up" (i.e. all addresses have not yet been calculated), so no requests are asserted. Once all addresses have become valid start-up ends and all requests are asserted. From now on when an address becomes invalid (because it has been used and acknowledged) it will be recalculated.

No prioritizing between addresses will ever need to be done, because the DRAM interface can at its fastest use an address every seventeen cycles while the Buffer Manager can recalculate an address every twelve cycles. Therefore only one address will ever be invalid at one time after start-up. So bmprtize will recalculate any invalid address that is not currently being calculated.

Start-up will be re-entered whenever buf_access is asserted and so no addresses will be supplied to the DRAM interface during microprocessor accesses.

B.4.6.2 Bminstr

Bminstr contains a MOD 12 cycle counter (the number of cycles it takes to generate an address). Even cycles start an instruction, whereas odd cycles end an instruction. The top 3 bits along with whether it is a read or a write calculation are decoded into instructions for bmrecalc as follows:

For read addresses:

TABLE B.4.1

Read address calculation

| Cycle | Operation | BusA | BusB | Result | Meaning of result's sign |
|---|---|---|---|---|---|
| 0–1 | ADD | READ | BASE | | |
| 2–3 | MOD | Accum | LIMIT | Address | |
| 4–5 | ADD | READ | "1" | | |
| 6–7 | MOD | Accum | LENGTH | READ | |
| 8–9 | SUB | NUMBER | "1" | NUMBER | |
| 10–11 | MOD | "0" | Accum | | SET_EMPTY (NUMBER >= 0) |

For write addresses:

TABLE B.4.2

For write address calculations

| Cycle | Operation | BusA | BusB | Result | Meaning of result's sign |
|---|---|---|---|---|---|
| 0–1 | ADD | NUMBER | READ | | |
| 2–3 | MOD | Accum | LIMIT | | |
| 4–5 | ADD | Accum | BASE | | |
| 6–7 | MOD | Accum | LIMIT | Address | |
| 8–9 | ADD | NUMBER | "1" | NUMBER | |
| 10–11 | MOD | Accum | LENGTH | | SET_FULL (NUMBER >= LENGTH) |

The result of the last operation is always held in the accumulator.

When there are no addresses to be recalculated the cycle counter idles at zero, thus causing an instruction that writes to none of the registers, and so has no affect.

B.4.6.3 Bmrecalc

Bmrecalc performs one operation every two clock cycles. It latches in the instruction from bminstr (and which buffer and io type) on an even counter cycle (start_alu_cyc), and latches the result of the operation on an odd counter cycle (end_alu_cyc). The result of the operation is always stored in the "Accum" register in addition to any registers specified by the instruction. Also on end_alu_cyc, bmrecalc informs bmprtize as to whether the use of the address just calculated will make the buffer full or empty, and when the address and full/empty has been successfully calculated (load_addr).

Full/empty are calculated using the sign bit of the operation's result.

The modulus operation is not a true modulus but A mod B is implemented as:

$(A>B?(A-B):A)$. However this is only wrong when $A>(2B-1)$, which will never occur.

B.4.6.4 Bmsnoop

Bmsnoop, is composed of four eighteen bit super snoopers that monitor the addresses supplied to the DRAM interface. The snooper must be "super" (i.e., can be accessed with the clocks running) to allow on chip testing of the external DRAM. These snoopers must work on a REQ/ACK system and are, therefore, different to any other on the device.

REQ/ACK is used on this interface as opposed to a two-wire protocol because it is essential to transmit information (i.e. acknowledges) back to the sender which an accept will not do). This is to acutely monitor the FIFO pointers. Having a 2-wire pipeline would not allow this, because it is not possible to know how full the pipeline of addresses is.

B.4.7 Registers

To gain microprocessor write access to the initialization registers one should be written to buf_access, access will be given when buf_access reads back one. Conversely to give up microprocessorwrite access zero should be written to buf_access. Access will be given when buf_access reads back zero. buf_access is reset to one.

The dynamic and initialization registers may be read at any time, however to ensure that the dynamic registers are not changing the microprocessor write access must be gained.

It is intended that the initialization registers be written to only once. Re-writing them may cause the buffers to operate incorrectly. It may be possible in a later revision to increase the buffer length on-the-fly and have the buffer manager use the new length when appropriate.

No check is ever made to see that the values in the initialization registers are sensible, e.g. that the buffers do not overlap. This is the user's responsibility.

TABLE B.4.3

Buffer manager non-keyhole registers

| Register Name | Usage | Address |
|---|---|---|
| CED_BUF_ACCESS | xxxxxxxD | 0 × 24 |
| CED_BUF_KEYHOLE ADDR | xxDDDDDD | 0 × 25 |
| CED_BUF_KEYHOLE | DDDDDDDD | 0 × 26 |
| CED_BUF_CB_WR_SNP_2 | xxxxxxDD | 0 × 54 |
| CED_BUF_CB_WR_SNP_1 | DDDDDDDD | 0 × 55 |
| CED_BUF_CB_WR_SNP_0 | DDDDDDDD | 0 × 56 |
| CED_BUF_CB_RD_SNP_2 | xxxxxxDD | 0 × 57 |
| CED_BUF_CB_RD_SNP_1 | DDDDDDDD | 0 × 58 |
| CED_BUF_CB_RD_SNP_0 | DDDDDDDD | 0 × 59 |
| CED_BUF_TB_WR_SNP_2 | xxxxxxDD | 0 × 5a |
| CED_BUF_TB_WR_SNP_1 | DDDDDDDD | 0 × 5b |
| CED_BUF_TB_WR_SNP_0 | DDDDDDDD | 0 × 5c |
| CED_BUF_TB_RD_SNP_2 | xxxxxxDD | 0 × 5d |
| CED_BUF_TB_RD_SNP_1 | DDDDDDDD | 0 × 5e |
| CED_BUF_TB_RD_SNP_0 | DDDDDDDD | 0 × 5f |

Where D indicates a registers bit and x shows no register bit.

TABLE B.4.4

Registers in buffer manager keyhole

| Keyhole Register Name | Usage | Keyhole Address |
|---|---|---|
| CED_BUF_CB_BASE_3 | xxxxxxxx | 0 × 00 |
| CED_BUF_CB_BASE_2 | xxxxxxDD | 0 × 01 |
| CED_BUF_CB_BASE_1 | DDDDDDDD | 0 × 02 |
| CED_BUF_CB_BASE_0 | DDDDDDDD | 0 × 03 |
| CED_BUF_CB_LENGTH_3 | xxxxxxxx | 0 × 04 |
| CED_BUF_CB_LENGTH_2 | xxxxxxDD | 0 × 05 |
| CED_BUF_CB_LENGTH_1 | DDDDDDDD | 0 × 06 |
| CED_BUF_CB_LENGTH_0 | DDDDDDDD | 0 × 07 |
| CED_BUF_CB_READ_3 | xxxxxxxx | 0 × 08 |
| CED_BUF_CB_READ_2 | xxxxxxDD | 0 × 09 |
| CED_BUF_CB_READ_1 | DDDDDDDD | 0 × 0a |
| CED_BUF_CB_READ_0 | DDDDDDDD | 0 × 0b |
| CED_BUF_CB_NUMBER_3 | xxxxxxxx | 0 × 0c |
| CED_BUF_CB_NUMBER_2 | xxxxxxDD | 0 × 0d |
| CED_BUF_CB_NUMBER_1 | DDDDDDDD | 0 × 0e |
| CED_BUF_CB_NUMBER_0 | DDDDDDDD | 0 × 0f |
| CED_BUF_TB_BASE_3 | xxxxxxxx | 0 × 10 |
| CED_BUF_TB_BASE_2 | xxxxxxDD | 0 × 11 |
| CED_BUF_TB_BASE_1 | DDDDDDDD | 0 × 12 |
| CED_BUF_TB_BASE_0 | DDDDDDDD | 0 × 13 |
| CED_BUF_TB_LENGTH_3 | xxxxxxxx | 0 × 14 |
| CED_BUF_TB_LENGTH_2 | xxxxxxDD | 0 × 15 |
| CED_BUF_TB_LENGTH_1 | DDDDDDDD | 0 × 16 |
| CED_BUF_TB_LENGTH_0 | DDDDDDDD | 0 × 17 |
| CED_BUF_TB READ_3 | xxxxxxxx | 0 × 18 |
| CED_BUF_TB_READ_2 | xxxxxxDD | 0 × 19 |
| CED_BUF_TB_READ_1 | DDDDDDDD | 0 × 1a |
| CED_BUF_TB_READ_0 | DDDDDDDD | 0 × 1b |
| CED_BUF_TB_NUMBER_3 | xxxxxxxx | 0 × 1c |
| CED_BUF_TB_NUMBER_2 | xxxxxxDD | 0 × 1d |
| CED_BUF_TB_NUMBER_1 | DDDDDDDD | 0 × 1e |
| CED_BUF_TB_NUMBER_0 | DDDDDDDD | 0 × 1f |
| CED_BUF_LIMIT_3 | xxxxxxxx | 0 × 20 |
| CED_BUF_LIMIT_2 | xxxxxxDD | 0 × 21 |
| CED_BUF_LIMIT_1 | DDDDDDDD | 0 × 22 |
| CED_BUF_LIMIT_0 | DDDDDDDD | 0 × 23 |
| CED_BUF_CSR | xxxxDDDD | 0 × 24 |

B.4.8 Verification

Verification was conducted in Lsim with small FIFOs onto a dummy DRAM interface, and in C-code as part of the top level chip simulation.

B.4.9 Testing

Test coverage to the bman is through the snoopers in bmsnoop, the dynamic registers (shown in B.4.4) and using the scan chain which is part of the DRAM interface scan chain.

We claim:

1. An image formatter for processing encoded video data comprising:

an input element for receiving encoded data having a frame rate and an arrival rate;

a memory defining at least three buffers for storage of the encoded data, one of said buffers being a display buffer, and another of said buffers being an arrival buffer;

a write address generator for generating write addresses for data being stored thereat in said memory;

a read address generator for generating read addresses for reading data stored there at in said memory;

an output interface linked to said read address generator that produces decoded data at a display rate; and a buffer manager responsive to said arrival rate, said display rate, and said frame rate for allocating said buffers to said write address generator and said read address generator, wherein said buffers are allocated to said write address generator in response to a timing regime.

2. The image formatter according to claim 1, wherein said read address generator and said buffer manager are connected by a plurality of two-wire interfaces, wherein said two-wire interfaces each comprise: a sender, a receiver, and a clock connected to said sender and said receiver, wherein data is transferred from said sender to said receiver upon a transition of said clock only when said sender is ready and said receiver is ready.

3. The image formatter according to claim 1, wherein said input element and said buffer manager are connected by a two-wire interface, wherein said two-wire interface comprises: a sender, a receiver, and a clock connected to said sender and said receiver, wherein data is transferred from said sender to said receiver upon a transition of said clock only when said sender is ready and said receiver is ready.

4. The image formatter according to claim 1, wherein said write address generator and said buffer manager are connected by a two-wire interface, wherein said two-wire interface comprises: a sender, a receiver, and a clock connected to said sender and said receiver, wherein data is transferred from said sender to said receiver upon a transition of said clock only when said sender is ready and said receiver is ready.

5. The image formatter according to claim 1, further comprising a setup register having a picture index stored therein, wherein said buffer manager asserts a first signal when received encoded data represents a picture having an index corresponding to said picture index, and wherein said buffer manager asserts a second signal when said display buffer has a picture number that is less than a current presentation number.

6. The image formatter according to claim 1, wherein said timing regime comprises an arrival rate of video data.

7. The image formatter according to claim 1, wherein said timing regime comprises an display rate of video data.

8. The image formatter according to claim 1, wherein said timing regime comprises an presentation rate of an encoded video sequence.

* * * * *